United States Patent [19]
Hervin et al.

[11] Patent Number: 5,961,575
[45] Date of Patent: *Oct. 5, 1999

[54] MICROPROCESSOR HAVING COMBINED SHIFT AND ROTATE CIRCUIT

[75] Inventors: Mark W. Hervin, Dallas; David B. Erickson, Plano, both of Tex.

[73] Assignee: National Semiconductor Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/607,057

[22] Filed: Feb. 26, 1996

[51] Int. Cl.⁶ ............................................. G06F 7/38
[52] U.S. Cl. ............................... 708/209; 712/223; 712/1
[58] Field of Search .................................. 395/800, 898, 395/800.01, 564; 364/715.08, 947.6

[56] References Cited

U.S. PATENT DOCUMENTS

| | | | |
|---|---|---|---|
| Re. 33,664 | 8/1991 | Kang et al. | 364/947 |
| 4,495,598 | 1/1985 | Vahlstrom et al. | 395/898 |
| 4,583,197 | 4/1986 | Chappell et al. | 364/715.08 |
| 5,379,240 | 1/1995 | Byrne | 364/715.08 |
| 5,781,457 | 7/1998 | Cohen et al. | 364/716.02 |

*Primary Examiner*—Meng-Ai T. An
*Assistant Examiner*—Walter D. Davis, Jr.
*Attorney, Agent, or Firm*—John L. Maxin

[57] ABSTRACT

Circuit for performing arithmetic operations in a 32-bit architecture. The circuit includes a five stage shift and rotate circuit coupled between first and second 32-bit busses in the following sequence: an 8-bit shift and rotate circuit, a 16-bit shift and rotate circuit, a 1-bit shift and rotate circuit, a 2-bit shift and rotate circuit and a 4-bit shift and rotate circuit. For double word sized (32-bit) operands, the variously sized shift and rotate circuits may be selectively enabled to perform between 1-bit and 31-bit shift/rotate/pass operations. For byte sized operands, the 8-bit and 16-bit shift and rotate circuits are used to pre-process the operands while the 1-bit, 2-bit and 4-bit shift and rotate circuits are selectively enabled to perform the full range, i.e., 1-bit to 7-bit, of possible shift/rotate operations. For word sized (16-bit) operands, the 16-bit or 8-bit and 16-bit shift and rotate circuits are used to pre-process the operands while the 1-bit, 2-bit and 4-bit shift and rotate circuits are selectively enabled to perform the full range of shift/rotate operations.

25 Claims, 8 Drawing Sheets

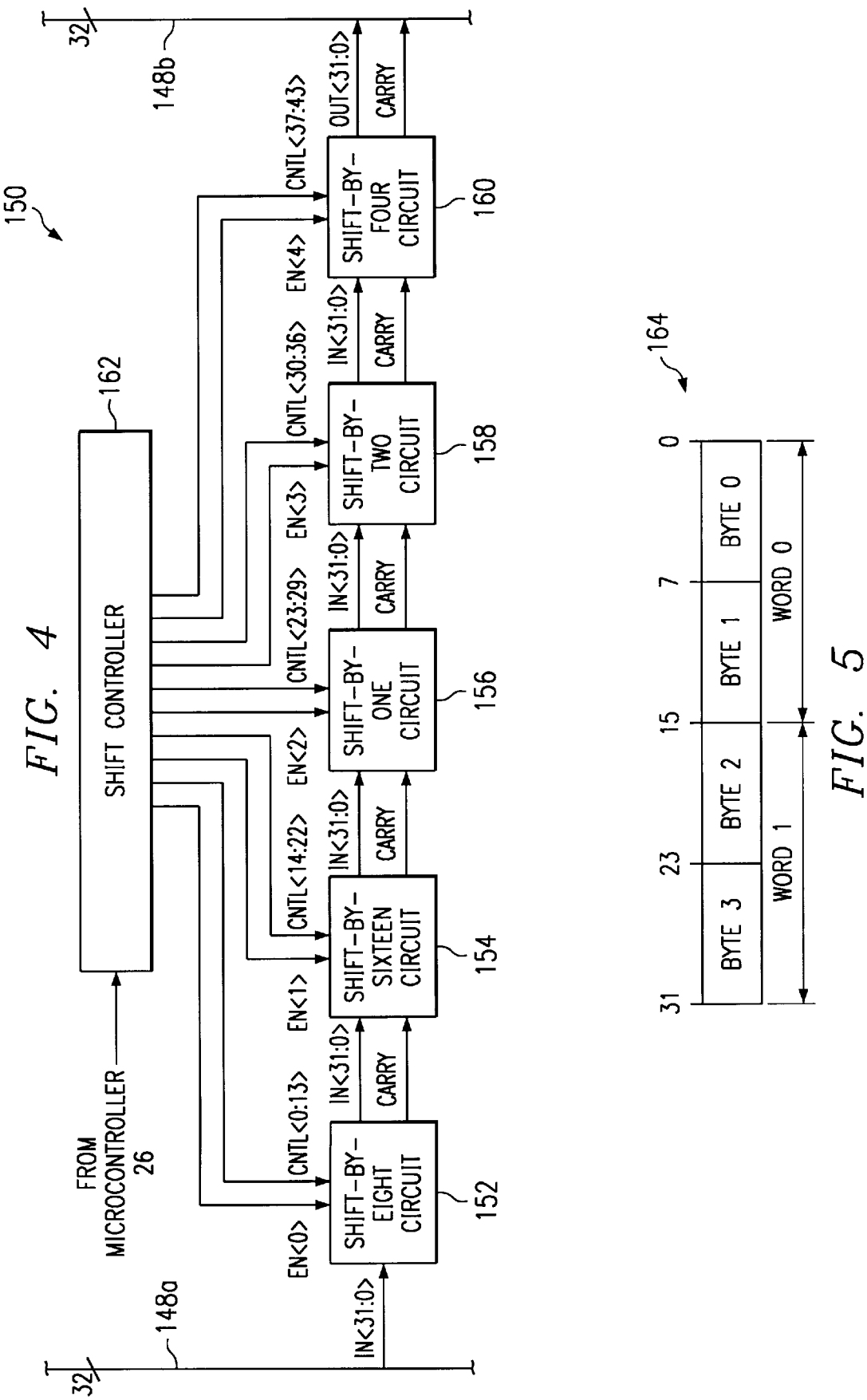

MICROPROCESSOR HAVING COMBINED SHIFT AND ROTATE CIRCUIT

BACKGROUND OF THE INVENTION

1. Field of the Invention

The present invention generally relates to microprocessors and, more particularly, to a microprocessor having a multiple stage shifter which selectively performs pre-processing and shift/rotate/pass operations to produce improved performance of shift/rotate operations thereby.

2. Description of Related Art

Digital circuitry for performing arithmetic operations such as shift and/or rotate operations have long been known in the art. In a shift operation, data stored in a storage device, commonly referred to as a shift register, is moved relative to the boundaries of the device. An arithmetic shift right effects a divide by 2 operation while an arithmetic shift left effects a multiply by 2 operation. In a circular shift operation, also known as a rotate, the rightmost and leftmost positions in the shift register are treated as being adjacent during the shift. A rotate operation may be a rotate left (or "ROL") operation in which all of the bits of an operand are shifted left by one or more positions and the most significant bits are shifted around to become the least significant bits or a rotate right (or "ROR") operation in which all of the bits of the operand shifted right by one or more positions and the least significant bits are shifted around to become the most significant bits.

Digital circuitry to perform the aforementioned arithmetic operations is commonly found in the execution unit of a microprocessor. In 32-bit microprocessor architectures, however, the circuitry becomes more cumbersome due to an increase in the number of types of rotate operations which may be performed. Specifically, the size of the operand to be rotated may be byte, word or double word. To rotate a byte size operand, bits 0 and 7 must be interconnected. To rotate a word size operand, bits 0 and 15 must be interconnected. Finally, to rotate a double word size operand, bit 0 and 31 must be interconnected.

One proposed solution to this problem involves providing a conditioning unit which pre-processes byte and/or word size operands before they are provided to the shift unit for the rotate operation. More specifically, it has been proposed that the contents of byte or word sized operands are replicated or "smeared" into the other bytes of the 32-bit register. For example, if a byte size operand is placed into byte 0 (bits 0–7) of a 4 byte (32 bit) register, the contents of byte 0 are smeared into bytes 1, 2 and 3. Then, to rotate byte 0, the only connection required is between bits 0 and 31. When the rotate operation is complete, byte 0 holds the result while bytes 1, 2 and 3 are discarded.

While the proposed solution would successfully reduce the number of interconnections between the various bits of the shift register, such a reduction was achieved only at the cost of adding an additional unit to precondition selected operands. Such a preconditioning unit may be seen by reference to U.S. Pat. No. 5,379,240 to Byrne.

Unfortunately, preconditioning units often add to the overhead attributable to arithmetic operations. Thus, it can be readily seen from the foregoing that it would be desirable to provide a shift and rotate circuit which eliminates the need for a preconditioning unit without increasing the number of interconnections required to perform rotate operations on the various sized operands used in arithmetic operations in 32-bit architectures. It is, therefore, the object of this invention to provide a shift and rotate circuit uniquely configured to both reduce the number of interconnections required to perform rotate operations and eliminate the preconditioning unit.

SUMMARY OF THE INVENTION

The present invention is directed to a circuit for performing arithmetic operations which both reduces the number of interconnections necessary to provide a combined shifter/rotator circuit while eliminating the need for a preconditioning unit used to pre-process byte and word sized operands to be used in shift/rotate operations performed in 32-bit architectures. The circuit includes a five stage shift and rotate circuit coupled between first and second 32-bit busses in the following sequence: an 8-bit shift and rotate circuit, a 16-bit shift and rotate circuit, a 1-bit shift and rotate circuit, a 2-bit shift and rotate circuit and a 4-bit shift and rotate circuit. For double word (32-bit) operands, the variously sized shift and rotate circuits may be selectively enabled to perform between 0-bit and 31-bit shift/rotate operations. For byte sized operands, the 8-bit and 16-bit shift and rotate circuits are used to pre-process the operands while the 1-bit, 2-bit and 4-bit shift and rotate circuits are selectively enabled to perform the full range, i.e., 0-bit to 7-bit, of possible shift/rotate operations. Similarly, for word sized operands, the 8-bit and 16-bit shift and rotate circuits are used to pre-process the operands while the 1-bit, 2-bit and 4-bit shift and rotate circuits are selectively enabled to perform the full range of shift/rotate operations. In this aspect, pre-processing of the word size operand may include a swap which, when combined with a shift/rotate operation between 0 and 7 bits, effectively results in a full range, i.e., 0-bit to 15-bit, of possible shift/rotate operations.

BRIEF DESCRIPTION OF THE DRAWING

The present invention may be better understood, and its numerous objects, features and advantages will become apparent to those skilled in the art by reference to the accompanying drawing, in which:

FIG. 4 is a block diagram of a combined shift and rotate circuit incorporated in an execution unit of the microprocessor of FIG. 1A;

FIG. 5 illustrates a 32-bit operand input to the combined shift and rotate circuit of FIG. 4;

FIGS. 7A–E illustrate a 3-bit rotate operation performed on a byte sized operand using the combined shift and rotate circuit of FIG. 4;

FIGS. 8A–E illustrate a 3-bit rotate operation performed on a word sized operand using the combined shift and rotate circuit of FIG. 4; and FIGS. 9A–E illustrate an 11-bit rotate operation performed on a word sized operand using the combined shift and rotate circuit of FIG. 4.

DETAILED DESCRIPTION

The detailed description of an exemplary embodiment of the microprocessor of the present invention is organized as follows:

1. Exemplary Processor System
   1.1. Microprocessor
   1.2. System
2. Generalized Pipeline Architecture
3. Combined Shift and Rotate Circuit This organizational table, and the corresponding headings used in this detailed description, are provided for the convenience of reference only. Detailed description of conventional or known aspects of the microprocessor are omitted as to not obscure the description of the invention with unnecessary detail.

1. Exemplary Processor System

Figure 1A:
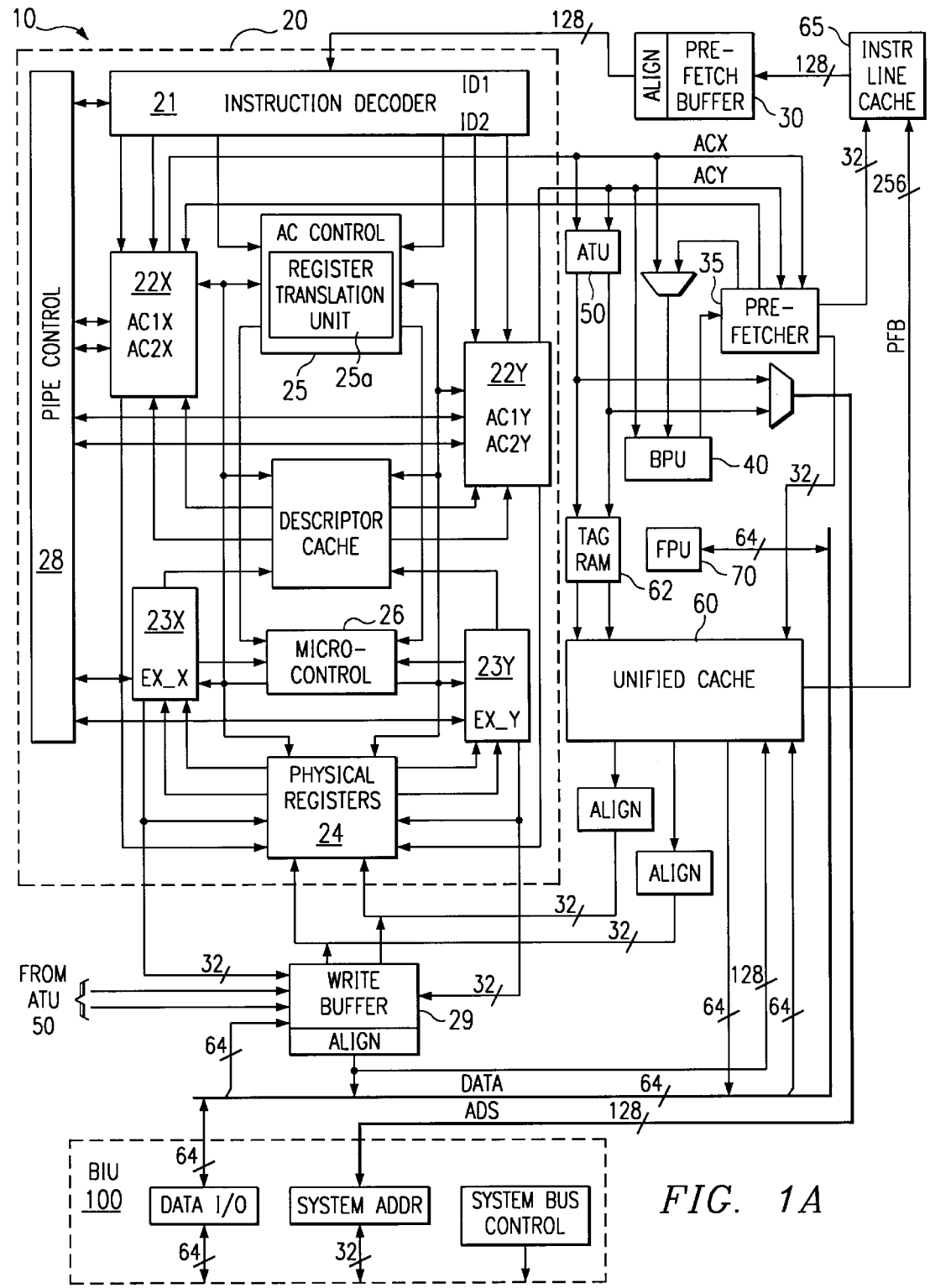
FIG. 1A illustrates a block diagram of a microprocessor circuit having a combined shift and rotate circuit constructed in accordance with the teachings of the present invention.
Figure 1B:
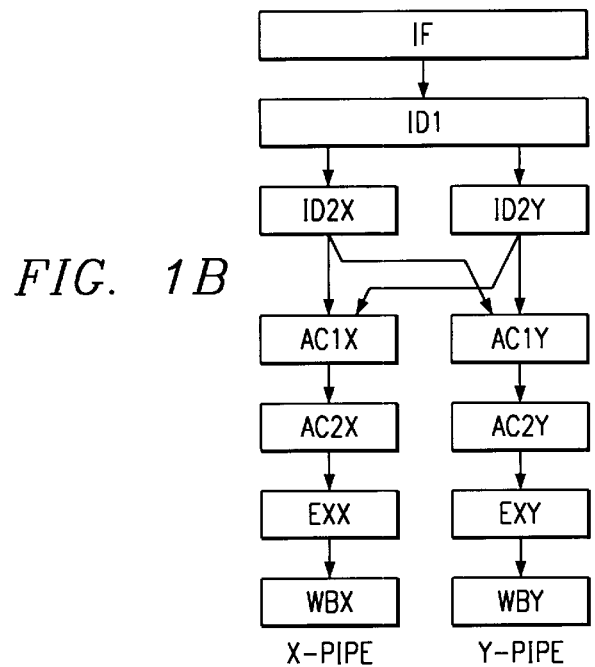
FIG. 1B illustrates a generalized block diagram of the instruction pipeline stages for the microprocessor circuit illustrated in FIG. 1A.
Figure 2:
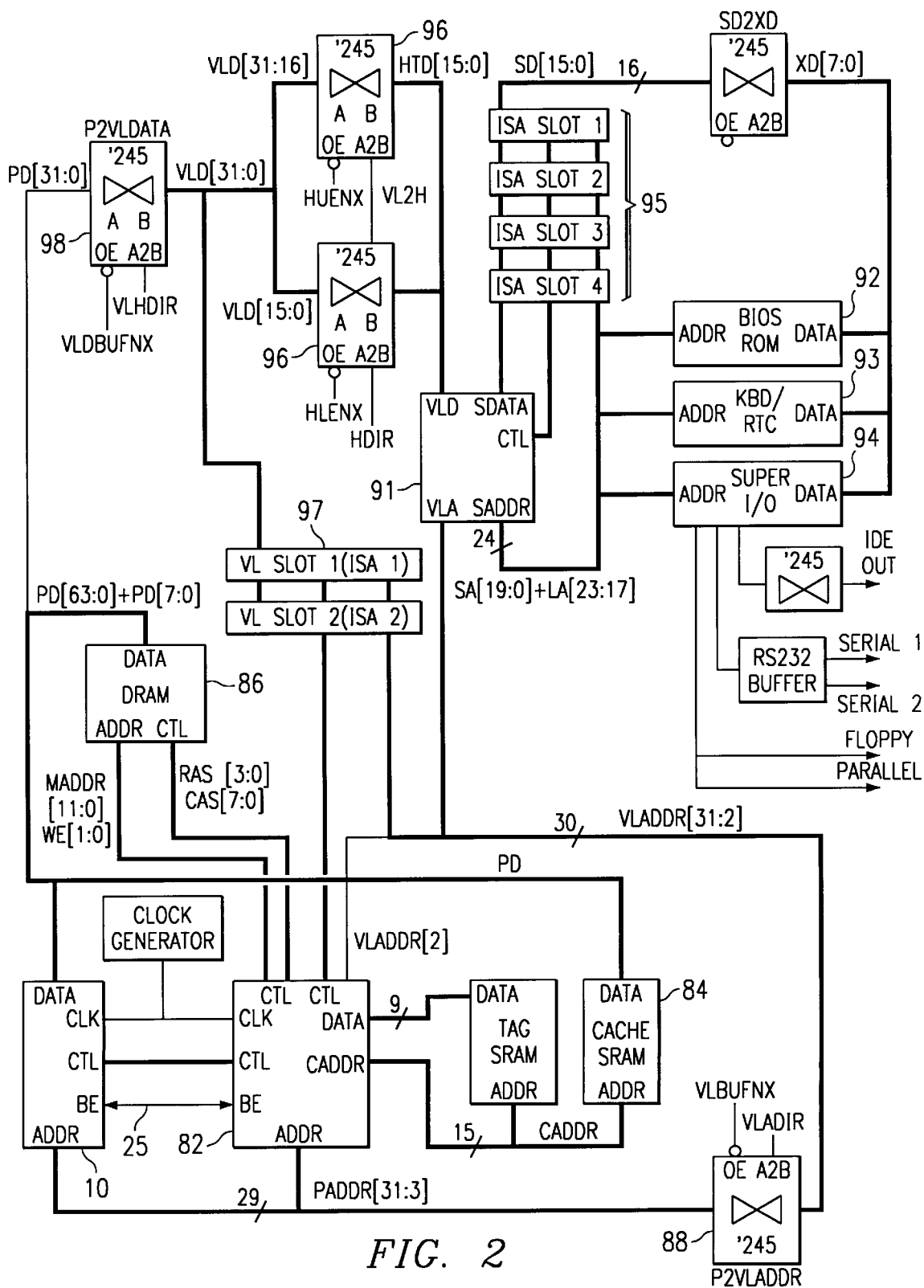
FIG. 2 illustrates a block diagram of a processor system which incorporates the microprocessor circuit of FIG. 1A.

The exemplary processor system is shown in FIGS. 1A, 1B, and 2. FIGS. 1A and 1B respectively illustrate the basic functional blocks of the exemplary superscalar, superpipelined microprocessor along with the pipe stages of the two execution pipelines. FIG. 2 illustrates an exemplary processor system (motherboard) design using the microprocessor.

1.1. Microprocessor Referring to FIG. 1A, the major sub-blocks of a microprocessor 10 include:

(a) central processing unit (CPU) core 20;
(b) prefetch buffer 30;
(c) prefetcher 35;
(d) branch processing unit (BPU) 40;
(e) address translation unit (ATU) 50; and
(f) unified 16 Kbyte code/data cache 60, including TAG RAM 62.

A 256 byte instruction line cache 65 provides a primary instruction cache to reduce instruction fetches to the unified cache, which operates as a secondary instruction cache. An onboard floating point unit (FPU) 70 executes floating point instructions issued to it by the CPU core 20.

The microprocessor uses internal 32-bit address and 64-bit data buses ADS and DATA, respectively. A 256 bit (32 byte) prefetch bus (PFB), corresponding to the 32 byte line size of the unified cache 60 and the instruction line cache 65, allows a full line of 32 instruction bytes to be transferred to the instruction line cache in a single clock. Interface to external 32 bit address and 64 bit data buses is through a bus interface unit (BIU).

The CPU core 20 is a superscalar design with two execution pipes X and Y. It includes an instruction decoder 21, address calculation units 22X and 22Y, execution units 23X and 23Y, and a register file 24 with 32 32-bit registers. An AC control unit 25 includes a register translation unit 25a with a register scoreboard and register renaming hardware. A microcontrol unit 26, including a microsequencer and microROM, provides execution control.

Writes from CPU core 20 are queued into twelve 32 bit write buffers 29—write buffer allocation is performed by the AC control unit 25. These write buffers provide an interface for writes to the unified cache 60—noncacheable writes go directly from the write buffers to external memory. The write buffer logic supports optional read sourcing and write gathering.

A pipe control unit 28 controls instruction flow through the execution pipes, including: keeping the instructions in order until it is determined that an instruction will not cause an exception; squashing bubbles in the instruction stream; and flushing the execution pipes behind branches that are mispredicted and instructions that cause an exception. For each stage, the pipe control unit keeps track of which execution pipe contains the earliest instruction, provides a "stall" output, and receives a "delay" input.

BPU 40 predicts the direction of branches (taken or not taken), and provides target addresses for predicted taken branches and unconditional change of flow instructions (jumps, calls, returns). In addition, it monitors speculative execution in the case of branches and floating point instructions, i.e., the execution of instructions speculatively issued after branches which may turn out to be mispredicted, and floating point instructions issued to the FPU which may fault after the speculatively issued instructions have completed execution. If a floating point instruction faults, or if a branch is mispredicted (will not be known until the EX or WB stage for the branch), then the execution pipeline must be repaired to the point of the faulting or mispredicted instruction (i.e., the execution pipeline is flushed behind that instruction), and instruction fetch restarted.

Pipeline repair is accomplished by creating checkpoints of the processor state at each pipe stage as a floating point or predicted branch instruction enters that stage. For these checkpointed instructions, all resources (programmer visible registers, instruction pointer, conditional code register) that can be modified by succeeding speculatively issued instructions are checkpointed. If a checkpointed floating point instruction faults or a checkpointed branch is mispredicted, the execution pipeline is flushed behind the checkpointed instruction—for floating point instructions, this will typically mean flushing the entire execution pipeline, while for a mispredicted branch there may be a paired instruction in EX and two instructions in WB that would be allowed to complete.

For the exemplary microprocessor 10, the principle constraints on the degree of speculation are: (a) speculative execution is allowed for only up to four floating point or branch instructions at a time (i.e., the speculation level is maximum 4), and (b) a write or floating point store will not complete to the cache or external memory until the associated branch or floating point instruction has been resolved (i.e., the prediction is correct, or floating point instruction does not fault).

The unified cache 60 is a 4-way set associative (with a 4k set size), using a pseudo-LRU replacement algorithm, with write-through and write-back modes. It is dual ported (through banking) to permit two memory accesses (data read, instruction fetch, or data write) per clock. The instruction line cache is a fully associative, lookaside implementation (relative to the unified cache), using an LRU replacement algorithm.

The FPU 70 includes a load/store stage with 4-deep load and store queues, a conversion stage (32-bit to 80-bit extended format), and an execution stage. Loads are controlled by the CPU core 20, and cacheable stores are directed through the write buffers 29 (i.e., a write buffer is allocated for each floating point store operation).

Referring to FIG. 1B, the microprocessor has seven-stage X and Y execution pipelines: instruction fetch IF), two instruction decode stages (ID1, ID2), two address calculation stages (AC1, AC2), execution (EX), and write-back (WB). Note that the complex ID and AC pipe stages are superpipelined.

The IF stage provides a continuous code stream into the CPU core 20. The prefetcher 35 fetches 16 bytes of instruction data into the prefetch buffer 30 from either the (primary) instruction line cache 65 or the (secondary) unified cache 60. BPU 40 is accessed with the prefetch address, and supplies target addresses to the prefetcher for predicted changes of flow, allowing the prefetcher to shift to a new code stream in one clock.

The decode stages ID1 and ID2 decode the variable length X86 instruction set. The instruction decoder 21 retrieves 16 bytes of instruction data from the prefetch buffer 30 each clock. In ID1, the length of two instructions is decoded (one each for the X and Y execution pipes) to obtain the X and Y instruction pointers—a corresponding X and Y bytes-used signal is sent back to the prefetch buffer (which then increments for the next 16 byte transfer). Also in ID1, certain instruction types are determined, such as changes of flow, and immediate and/or displacement operands are separated. The ID2 stage completes decoding the X and Y instructions, generating entry points for the microROM and decoding addressing modes and register fields.

During the ID stages, the optimum pipe for executing an instruction is determined, and the instruction is issued into that pipe. Pipe switching allows instructions to be switched from ID2X to AC1Y, and from ID2Y to AC1X. For the exemplary embodiment, certain instructions are issued only into the X pipeline: change of flow instructions, floating point instructions, and exclusive instructions. Exclusive instructions include: any instruction that may fault in the EX pipe stage and certain types of instructions such as protected mode segment loads, string instructions, special register access (control, debug, test), Multiply/Divide, Input/Output, Push All/Pop All (PUSH/POPA), and task switch. Exclusive instructions are able to use the resources of both pipes because they are issued alone from the ID stage (i.e., they are not paired with any other instruction). Except for these issue constraints, any instructions can be paired and issued into either the X or Y pipe.

The address calculation stages AC1 and AC2 calculate addresses for memory references and supply memory operands. The AC1 stage calculates two 32 bit linear (three operand) addresses per clock (four operand addresses, which are relatively infrequent, take two clocks). Data dependencies are also checked and resolved using the register translation unit 25a (register scoreboard and register renaming hardware)—the 32 physical registers 24 are used to map the 8 general purpose programmer visible logical registers defined in the X86 architecture (EAX, EBX, ECX, EDX, EDI, ESI, EBP, ESP).

The AC unit includes eight architectural (logical) registers (representing the X86 defined register set) that are used by the AC unit to avoid the delay required to access in AC1 the register translation unit before accessing register operands for address calculation. For instructions that require address calculations, AC1 waits until the required data in the architectural registers is valid (no read after write dependencies) before accessing those registers. During the AC2 stage, the register file 24 and the unified cache 60 are accessed with the physical address (for cache hits, cache access time for the dual ported unified cache is the same as that of a register, effectively extending the register set)—the physical address is either the linear address, or if address translation is enabled, a translated address generated by the ATU 50.

Translated addresses are generated by the ATU 50 from the linear address using information from page tables in memory and workspace control registers on chip. The unified cache is virtually indexed and physically tagged to permit, when address translation is enabled, set selection with the untranslated address (available at the end of AC1) and, for each set, tag comparison with the translated address from the ATU 50 (available early in AC2). Checks for any segmentation and/or address translation violations are also performed in AC2.

Instructions are kept in program order until it is determined that they will not cause an exception. For most instructions, this determination is made during or before AC2—floating point instructions and certain exclusive instructions may cause exceptions during execution. Instructions are passed in order from AC2 to EX (or in the case of floating point instructions, to the FPU)—because integer instructions that may still cause an exception in EX are designated exclusive, and therefore are issued alone into both execution pipes, handling exceptions in order is ensured.

The execution stages EXX and EXY perform the operations defined by the instruction. Instructions spend a variable number of clocks in EX, i.e., they are allowed to execute out of order (out of order completion). Both EX stages include adder, logical, and shifter functional units, and in addition, the EXX stage contains multiply/divide hardware.

The WB stage updates the register file 24, condition codes, and other parts of the machine state with the results of the previously executed instruction. The register file is written in Phase 1 (PH1) of WB and read in Phase 2 (PH2) of AC2.

1.2. System

Referring to FIG. 2 for the exemplary embodiment, microprocessor 10 is used in a processor system that includes a single chip memory and bus controller 82. The memory/bus controller 82 provides the interface between the microprocessor and the external memory subsystem—level two cache 84 and main memory 86—controlling data movement over the 64 bit processor data bus PD (the data path is external to the controller which reduces its pin count and cost).

Controller 82 interfaces directly to the 32-bit address bus PADDR, and includes a one bit wide data port (not shown) for reading and writing registers within the controller. A bi-directional isolation buffer 88 provides an address interface between microprocessor 10 and VL and ISA buses.

Controller 82 provides control for the VL and ISA bus interface. A VL/ISA interface chip 91 (such as an HT321) provides standard interfaces to a 32 bit VL bus and a 16 bit ISA bus. The ISA bus interfaces to BIOS 92, keyboard controller 93, and I/O chip 94, as well as standard ISA slots 95. The interface chip 91 interfaces to the 32 bit VL bus through a bi-directional 32/16 multiplexer 96 formed by dual high/low word [31:16]/[15:0] isolation buffers. The VL bus interfaces to standard VL slots 97, and through a bi-directional isolation buffer 98 to the low double word [31:0] of the 64 bit processor data (PD) bus.

2. Generalized Pipeline Architecture

Figure 3:
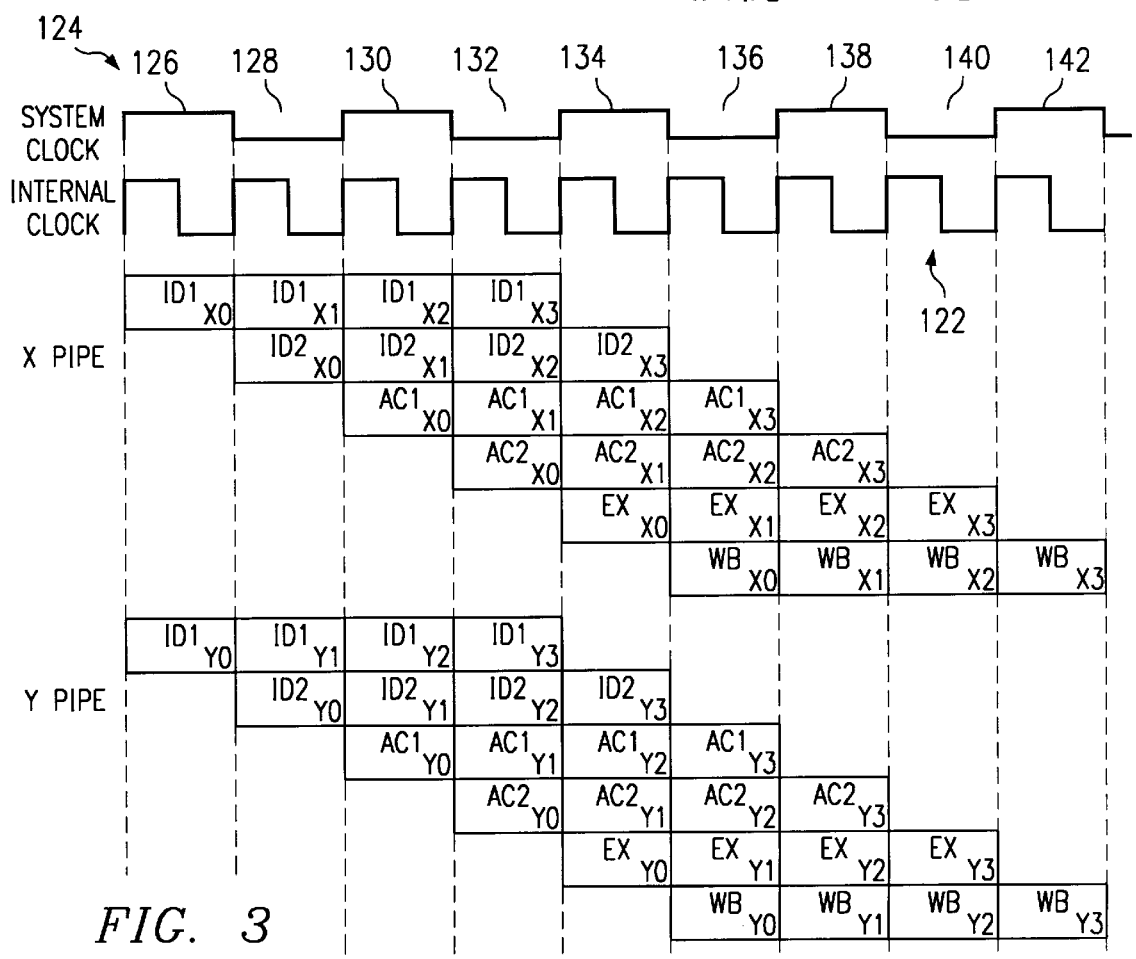
FIG. 3 illustrates a timing diagram for the flow of instructions through the pipeline stages of FIG. 1B.

FIG. 3 illustrates the flow of four instructions per pipeline, showing the overlapping execution of the instructions, for a two pipeline architecture. Additional pipelines and additional stages for each pipeline could also be provided. In the preferred embodiment, the microprocessor 10 uses an internal clock 122 which is a multiple of the system clock 124. In FIG. 3, the internal clock is shown as operating at two times the frequency of the system clock. During the first internal clock cycle 126, the ID1 stage operates on respective instructions X0 and Y0. During internal clock cycle 128, instructions X0 and Y0 are in the ID2 stage (X0 being in ID2x and Y0 being in ID2y) and instructions X1 and Y1 are in the ID1 stage. During internal clock cycle 130, instructions X2 and Y2 are in the ID1 stage, instructions X1 and Y1 are in the ID2 stage (X1 being in ID2x and Y1 being in ID2y) and instructions X0 and Y0 are in the AC1 stage (X0 being in AC1x and Y0 being in AC1y). During internal clock cycle 132, instructions X3 and Y3 are in the ID1 stage, instructions X2 and Y2 are in the ID2 stage, instructions X1 and Y1 are in the AC1 stage and instructions X0 and Y0 are in the AC2 stage. The instructions continue to flow sequentially through the stages of the X and Y pipelines. As shown in clocks 134–140, the execution portion of each instruction is performed on sequential clock cycles. This is a major advantage of a pipelined architecture—the number of instructions completed per clock is increased, without reducing the execution time of an individual instruction. Consequently, a greater instruction throughput is achieved with greater demands on the speed of the hardware.

The instruction flow shown in FIG. 3 is the optimum case. As shown, each pipe stage completes on time and no stage requires more than one clock cycle. In an actual machine, however, one or more stages may require additional clock cycles to complete, thereby changing the flow of instructions through the other pipe stages. Furthermore, the flow of instructions through one pipeline may be dependent upon the flow of instructions through the other pipeline.

A number of factors may cause delays in various stages of one or all of the pipelines. For example, an access to memory may miss in the memory cache, thereby preventing access of the data in the time required to process the instruction in one clock. This would require that either, or both, sides of the AC1 stage to delay until the data was retrieved from main memory. For a particular stage, other stages of the pipeline may be using a needed resource, such as a multiplier, which is only in one of the execution stages in the illustrated embodiment. In this case, the stage must delay until the resource is available. Data dependencies can also cause delays. If an instruction needs the result from a previous instruction, such as an ADD, it must wait until that instruction is processed by the execution unit.

Other delays are caused by "multi-box" instructions; i.e., instructions which are implemented using multiple microinstructions, and therefore require more than one clock cycle to complete. These instructions stop the flow of subsequent instructions through the pipeline at the output of the ID2 stage.

The flow of instructions through the pipeline is controlled by the pipe control unit 28. In the preferred embodiment, a single pipe control unit 28 is used to control the flow of instructions through both (or all) of the pipes. To control the flow of instructions through the pipes, the pipe control until 28 receives "delay" signals from the various units comprising the pipelines 102 and 104, and issues "stall" signals to the various units.

Although a single pipe control unit 28 is used for both X and Y pipelines, the pipelines themselves are controlled independent of one another. In other words, a stall in the X pipeline does not necessarily cause a stall in the Y pipeline.

3. Combined Shift and Rotate Circuit

Referring now to FIG. 4, a combined shift and rotate unit 150 constructed in accordance with the teachings of the present invention will now be described in greater detail. Such a unit is typically located within the execution unit of a microprocessor or other processing device. In the embodiment of the invention illustrated herein, the microprocessor 10 would include a combined shift and rotate unit 150 as part of both the execution unit 23X and the execution unit 23Y.

In the embodiment of the invention illustrated herein, the combined shift and rotate unit 150 is comprised of five stages—a shift-by-eight circuit 152, a shift-by-sixteen circuit 154, a shift-by-one circuit 156, a shift-by-two circuit 158 and a shift-by-four circuit 160. In an alternate embodiment of the invention not illustrated herein, the combined shift and rotate unit may be comprised of three stages—a shift-by-eight circuit, a shift-by-sixteen circuit and either a shift-by-one, shift-by-two or a shift-by-four circuit. In a second alternate embodiment of the invention not illustrated herein, the combined shift and rotate unit may be comprised of two stages—either a shift-by-eight or a shift-by-sixteen circuit and either a shift-by-one, shift-by-two or shift-by-four circuit.

The five stages of the illustrated combined shift and rotate unit 150 are coupled together, in series, between the 32-bit buses 148*a-b*. Each shift circuit 152 through 160 is configured to perform either a shift left, shift right, rotate left or rotate right operation, of the specified size, i.e., 8-bit, 16-bit, 1-bit, 2-bit and 4-bit, on a 32-bit, double word sized operand input thereto. In a shift left or shift right operation, the contents of the leftmost bit (bit 31) or rightmost bit (bit 0) is respectively shifted out of the operand while in a rotate left or rotate right operation, the contents of the leftmost bit or rightmost bit is placed in the rightmost bit or leftmost bit, respectively. As will be more fully described below, the shift-by-eight circuit 152 and the shift-by-sixteen circuit 154 are also configured to perform selected pre-processing operations on byte sized (8-bit) and word sized (16-bit) operands input thereto.

Operation of the shift-by-eight circuit 152, shift-by-sixteen circuit 154, shift-by-one circuit 156, shift-by-two circuit 158 and shift-by-four circuit 160 are controlled by shift controller 162 respectively coupled thereto. The shift controller 162 provides plural control signals to each shift circuit 152–160 which instructs that circuit as to which operations are to be performed thereby. Specifically, when a shift operation is to be performed using the combined shift and rotate circuit 150, the microcontrol unit 26 instructs the shift controller 162 as to size of the input operand, the type of shift operation to be performed on the input operand and which of the shift circuits 152–160 are needed to perform the selected shift operation on the input operand. In turn, the shift controller 162 enables selected ones of the shift circuits 152–160 and instructs the selected shift circuits as to which operation is to be performed. For example, if the microcontrol unit 26 instructs the shift controller 162 that a 4-bit rotate left operation is to be performed on an 8-bit operand using the shift-by-eight circuit 152, the shift-by-sixteen circuit 154 and the shift-by-four circuit 160, the shift controller 162 would enable the shift-by-eight circuit 152, the shift-by-16 circuit 154 and the shift-by-four circuit 160 and instruct the shift-by-eight circuit 152 to pre-process the input operand by performing an 8-bit "smear", or replicate, instruct the shift-by-16 circuit 154 to pre-process the input operand by performing a 16-bit smear and instruct the shift-by-4 circuit to perform a rotate left operation. It should be noted that full details as to what is encompassed by a "smear" operation is set forth in greater detail later in this application.

The shift-by-eight circuit 152 is coupled to the shift controller 162 by an enable input EN[0] and control inputs CNTL[0:13]. EN[0] instructs the shift-by-eight circuit 152 to either pass the input operand to the shift-by-sixteen circuit 154 or perform either a shift or pre-processing operation on the input operand. If enabled, CNTL[0:13] instructs the shift-by-eight circuit 152 as to which shift or preprocessing operation is to be performed on the input operand. The shift-by-eight circuit 152 performs pre-processing operations on 8-bit input operands by smearing, the contents of bits 0–7 in bits 7–15. The shift-by-eight circuit 152 may also be selectively enabled to perform 8-bit shift/rotate operations, for example, shift left, shift right, rotate left and rotate right on 32-bit input operands received from the bus 148*a*.

In addition to performing an 8-bit smear operation on 8-bit operands, the shift-by-eight unit 152 may also perform a swap operation on 16-bit operands whereby the contents of bits 0–7 of an operand are swapped with the contents of bits 8–15 of the operand. Of course, other 8-bit operations not necessary to an understanding of the present invention may also be enabled by CNTL[0:13].

The shift-by-sixteen circuit 154 is coupled to the shift controller 162 by a enable input EN[1] and control inputs CNTL[14:22]. EN[1] instructs the shift-by-sixteen circuit 154 to either pass the input operand to the shift-by-one circuit 156 or perform either a shift or pre-processing operation on the input operand. If enabled, CNTL[14:22] instructs the shift-by-sixteen circuit 152 as to which shift or pre-processing operation is to be performed on the input operand. The pre-processing operation which may be selectively performed by the shift-by-sixteen circuit 154 is a 16-bit smear operation in which the contents of bits 0–15 are replicated, or smeared, into bits 16–31. The shift-by-sixteen circuit 154 may also be selectively enabled to perform the previously discussed types of shift operations, now 16-bit operations, on 32-bit input operands received from the shift-by-eight circuit 152.

The shift-by-one circuit 156 is coupled to the shift controller 162 by an enable input EN[2] and control inputs CNTL[23:29]. EN[2] instructs the shift-by-one circuit 156 to either pass the input operand to the shift-by-two circuit 158 or perform an shift operation on the input operand. If enabled, CNTL[23:29] instructs the shift-by-one circuit 156 as to which shift operation is to be performed on the input operand. The shift-by-one circuit 156 may be selectively enabled to perform the previously discussed types of shift operations, now 1-bit operations, on 32-bit input operands received from the shift-by-sixteen circuit 154.

The shift-by-two circuit 158 is coupled to the shift controller 162 by an enable input EN[3] and control inputs CNTL[30:36]. EN[3] instructs the shift-by-two circuit 158 to either pass the input operand to the shift-by-four circuit 160 or perform a shift operation on the input operand. If enabled, CNTL[30:36] instructs the shift-by-two circuit 158 as to which shift operation is to be performed on the input operand. The shift-by-two circuit 158 may be selectively enabled to perform the previously discussed types of shift operations, now 2-bit operations, on 32-bit input operands received from the shift-by-one circuit 156.

The shift-by-four circuit 160 is coupled to the shift controller 162 by an enable input EN[4] and control inputs CNTL[37:43]. EN[4] instructs the shift-by-four circuit 160 to either pass the input operand to the bus 148*b* or perform a shift operation on the input operand. If enabled, CNTL[37:43] instructs the shift-by-four circuit 160 as to which shift operation is to be performed on the input operand. The shift-by-four circuit 160 may be selectively enabled to perform the previously discussed types of shift operations, now 4-bit operations, on 32-bit input operands received from the shift-by-two circuit 158.

It should be clearly understood that the foregoing description of the operation of the shift circuits 152–160 and shift controller 162 has been greatly simplified by omitting various details, generally known in the art, as to how the shift circuits perform the aforementioned shift and pre-processing operations.

Prior to describing the method of performing shift operations using the combined shift and rotate circuit 150, it may be useful to briefly describe the input operand itself. Turning momentarily to FIG. 5, therefore, a register 164 capable of holding 8, 16 and 32-bit input operands may now be seen. In alternate aspects of the invention, the register 168 may be coupled to the bus 148*a* or even located outside the execution unit 23*a*, for example, within the physical registers 24. An 8-bit input operand would be held in byte 0 (bits 0–7) of the register 164 while a word sized (16-bit) input operand would be held in bytes 0–1 (bits 0–15). Of course, a double word sized (32-bit) input operand would occupy bytes 0–3 (bits 0–31) of the register 164.

Figure 6:
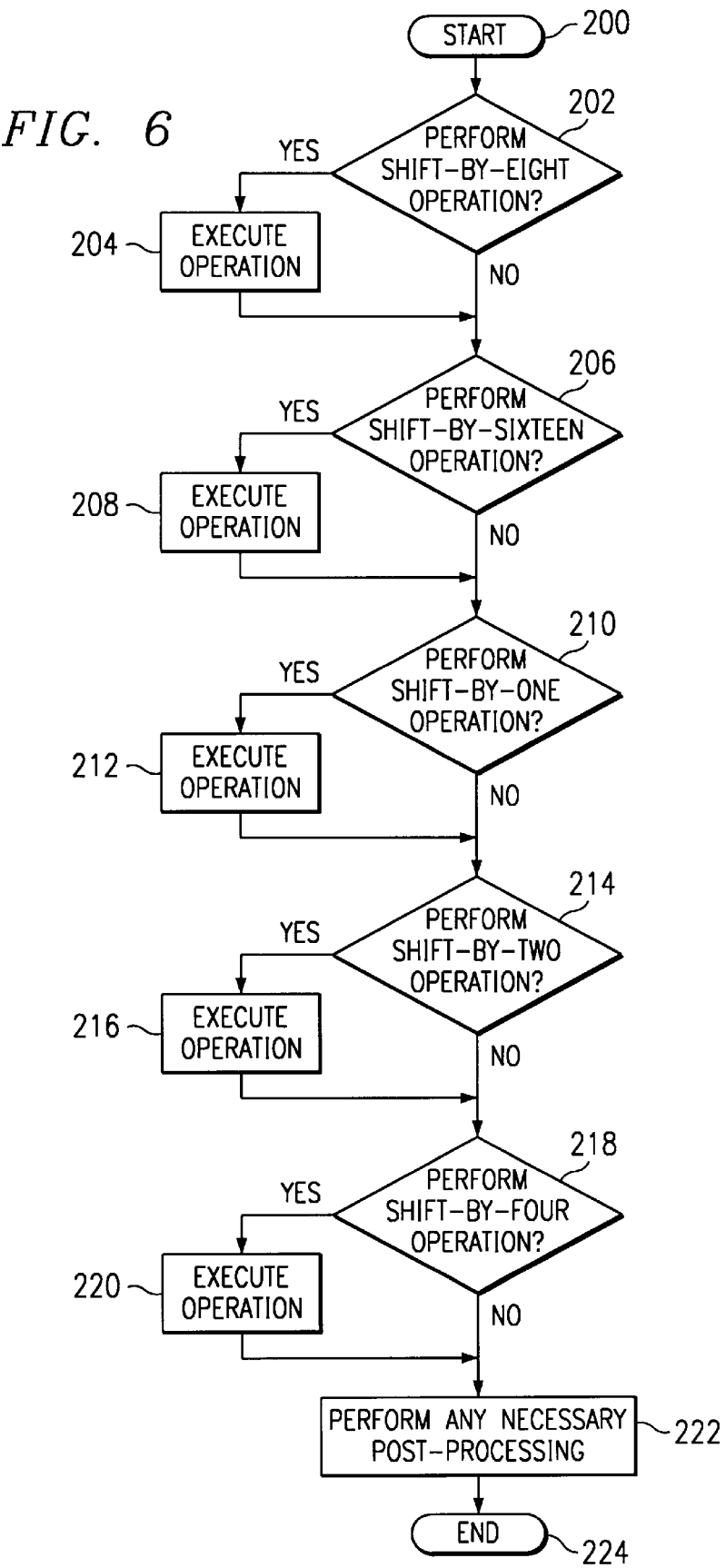
FIG. 6 is a flow chart of a method of performing shift operations using the combined shift and rotate circuit of FIG. 4.

Turning now to FIG. 6, the method of performing shift operations using the combined shift and rotate circuit 150 shall now be described in greater detail. The method commences at step 200 by propagating the input operand to the shift-by-eight circuit 152. If it is determined at step 202 that a shift/rotate or pre-processing operation is be performed by the shift-by-eight circuit 152, the method proceeds to step 204 and the selected shift/rotate or pre-processing operation is performed.

Upon completing the selected arithmetic or pre-processing operation at step 204 or if it was determined at step 202 that no shift/rotate or pre-processing operation is to be performed by the shift-by-eight circuit 152, the method proceeds to step 206 by propagating the output of the shift-by-eight circuit 152 to the shift-by-sixteen circuit 154 in a pass operation. If it is determined at step 206 that a shift/rotate or pre-processing operation is be performed by the shift-by-sixteen circuit 154, the method proceeds to step 208 and the selected shift/rotate or pre-processing operation is performed.

Upon completing the selected shift/rotate or pre-processing operation at step 208 or if it was determined at step 206 that a pass operation is to be performed by the shift-by-sixteen circuit 154, the method proceeds to step 210 by propagating the output of the shift-by-sixteen circuit 154 to the shift-by-one circuit 156. If it is determined at step 210 that a shift/rotate operation is to be performed by the shift-by-one circuit 156, the method proceeds to step 212 and the selected shift/rotate operation is performed.

Upon completing the selected shift/rotate operation at step 212 or if it was determined at step 210 that a pass operation is to be performed by the shift-by-one circuit 156, the method proceeds to step 214 by propagating the output of the shift-by-one circuit 156 to the shift-by-two circuit 158. If it is determined at step 214 that a shift/rotate operation is to be performed by the shift-by-two circuit 158, the method proceeds to step 216 and the selected shift/rotate operation is performed.

Upon completing the selected shift/rotate operation at step 216 or if it was determined at step 214 that a pass operation is to be performed by the shift-by-two circuit 158, the method proceeds to step 218 by propagating the output of the shift-by-two circuit 158 to the shift-by-four circuit 160. If it is determined at step 218 that a shift/rotate operation is to be performed by the shift-by-four circuit 160, the method proceeds to step 220 and the selected shift/rotate operation is performed.

Upon completing the selected shift/rotate operation at step 220 or if it was determined at step 218 that a pass operation is to be performed by the shift-by-four circuit 160, the method proceeds to step 222 where any necessary post-processing of the operand is performed. For example, if the input operand propagated to the shift-by-eight circuit 152 was an 8-bit operand pre-processed with an 8-bit smear operation in the shift-by-eight circuit 152 and a 16-bit smear operation in the shift-by-sixteen circuit 154 to expand the input operand to 32-bits, the 32-bit result is placed on bus 148*b* where it is propagated to a 32-bit register located within the register file 24. There, bits 8–31 of the result output by the shift-by-four circuit 160 are discarded. Similarly, if the input operand propagated to the shift-byeight circuit 152 was a 16-bit operand pre-processed with a 16-bit smear operation in the shift-by-sixteen circuit 154 to expand the input operand to 32-bits, bits 16–31 of the result output by the shift-by-four circuit 160 would be discarded after the result is placed in the register file 24.

Figures 7A, 7B, 7C, 7D, 7E:
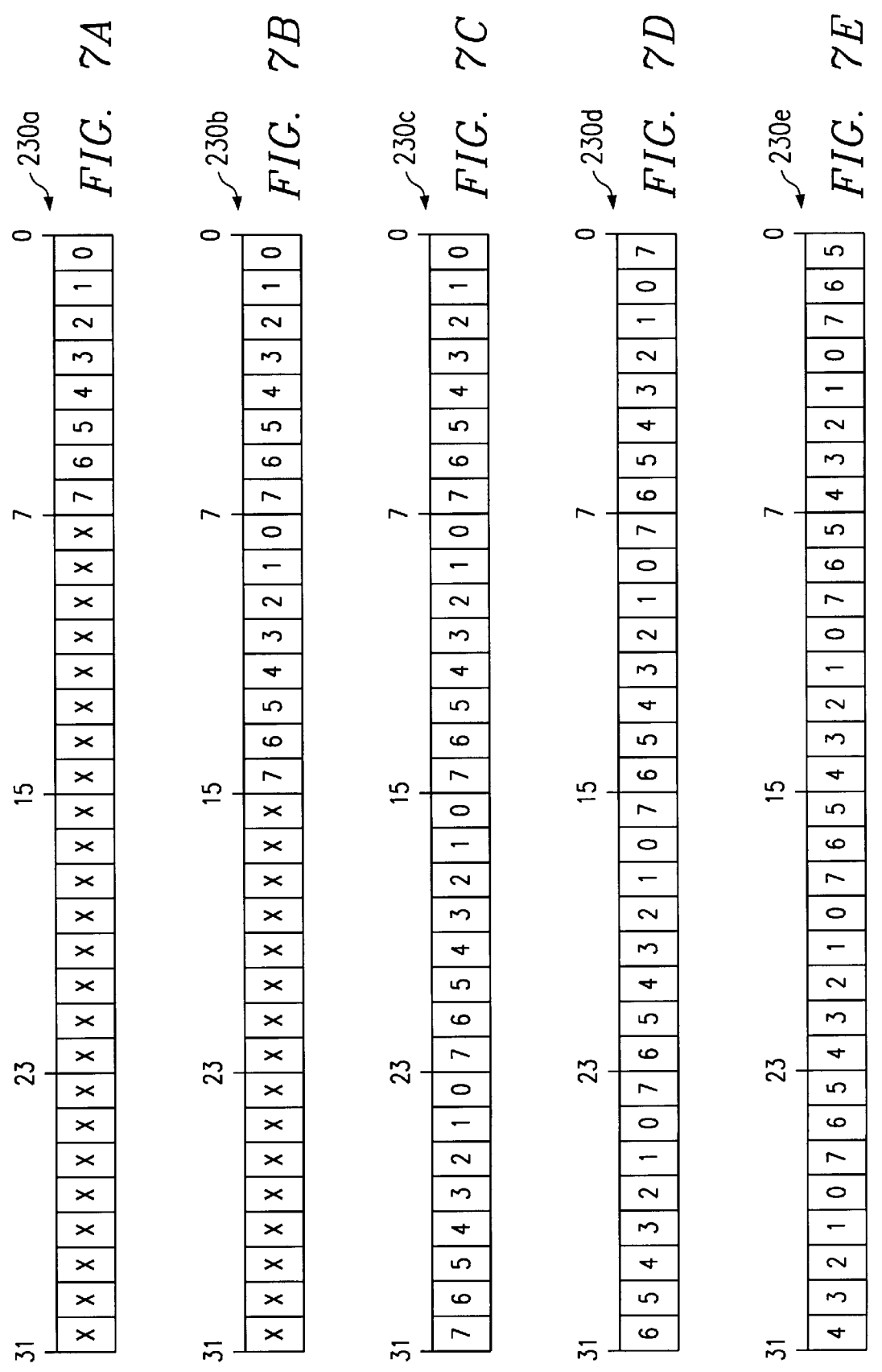

Referring next to FIGS. 7A–E, a 3-bit rotate left operation performed on a 8-bit operand will now be described in greater detail. As previously discussed, an 8-bit operand occupies the rightmost byte of the register 164. Thus, as shown in FIG. 7A, the contents of the 8-bit operand 230a input the shift-by-eight circuit 152 is held in bits 0–7 while bits 8–31 are "don't cares". The shift-by-eight circuit 152 smears the contents of bits 0–7 into bits 8–15 while bits 16–31 remain "don't cares", thereby producing the operand 230b illustrated in FIG. 7B. The operand 230b is propagated to the shift-by-sixteen circuit 154 where the contents of bits 0–15 are smeared into bits 16–31 to produce the operand 230c illustrated in FIG. 7C.

The operand 230c is then propagated to the shift-by-one circuit 156. As the shift operation being performed is a 3-bit rotate left operation, the shift-by-one circuit 156 shifts the contents of bits 0–30 one bit to the left and places the contents of bit 31 into bit 0, thereby producing the operand 230d illustrated in FIG. 7D. The operand 230d is then propagated to the shift-by-two circuit 158. Again, as the shift operation being performed is a 3-bit rotate left operation, the shift-by-two circuit 158 shifts the contents of bits 0–29 two bits to the left and places the contents of bits 30–31 into bits 0–1, thereby producing the operand 230e illustrated in FIG. 7E. As no further shift or rotate operations are necessary, operand 230e passes through the shift-by-four circuit 160 and is placed on the bus 148b for transport to the register file 24 where bits 8–31 are discarded. As may be seen, bits 0–7 of the result placed on the bus 148b is a 3-bit rotate left operation performed on an 8-bit operand. In this manner, a 3-bit rotate operation is performed on a byte sized operand with only a single interconnect between bits 0 and 31 and without need for either an interconnection between bits 0 and 7 or for a separate conditioning unit to pre-process the byte sized operand.

Figures 8A, 8B, 8C, 8D, 8E:
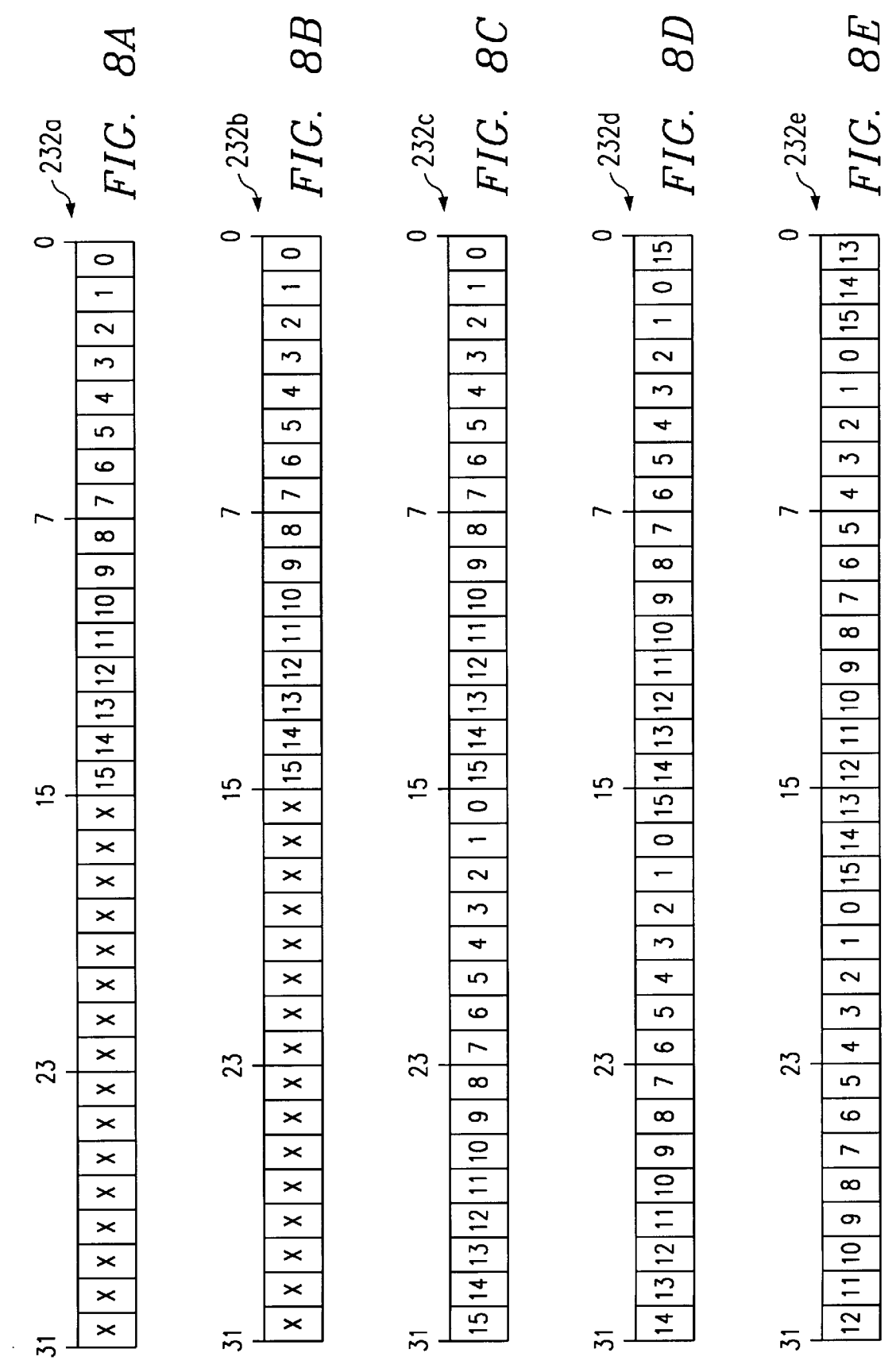

Referring next to FIGS. 8A–E, a 3-bit rotate left operation performed on a 16-bit operand will now be described in greater detail. As previously discussed, a 16-bit operand occupies the rightmost word (bytes 0–1) of the register 164. Thus, as shown in FIG. 8A, the contents of the 16-bit operand 232a input the shift-by-eight circuit 152 is held in bits 0–15 while bits 16–31 are "don't cares". The operand 232a passes through the shift-by-eight circuit 152 without pre-processing. Thus, as illustrated in FIG. 8B, the operand 232b output the shift-by-eight circuit 152 remains unchanged. The operand 232b is propagated to the shift-by-sixteen circuit 154 where the contents of bits 0–15 are smeared into bits 16–31 to produce the operand 232c illustrated in FIG. 8C. The operand 232c is then propagated to the shift-by-one circuit 156. As the shift operation being performed is a 3-bit rotate left operation, the shift-by-one circuit 156 shifts the contents of bits 0–30 one bit to the left and places the contents of bit 31 into bit 0, thereby producing the operand 232d illustrated in FIG. 8D. The operand 232d is then propagated to the shift-by-two circuit 158. Again, as the shift operation being performed is a 3-bit rotate left operation, the shift-by-two circuit 158 shifts the contents of bits 0–29 two bits to the left and places the contents of bits 30–31 into bits 0–1, thereby producing the operand 232e illustrated in FIG. 8E. As no further shift or rotate operations are necessary, operand 232e passes through the shift-by-four circuit 160 and is placed on the bus 148b for transport to the register file 24 where bits 16–31 are discarded. As may be seen, bits 0–15 of the result placed on the bus 148b is a 3-bit rotate left operation performed on an 16-bit operand. In this manner, a 3-bit rotate operation is performed on a word sized operand using only the same interconnect between bits 0 and 31 needed for performing rotate operations on byte sized operands and without need for either an interconnection between bits 0 and 15 or for a separate conditioning unit to pre-process the word sized operand.

Figures 9A, 9B, 9C, 9D, 9E:
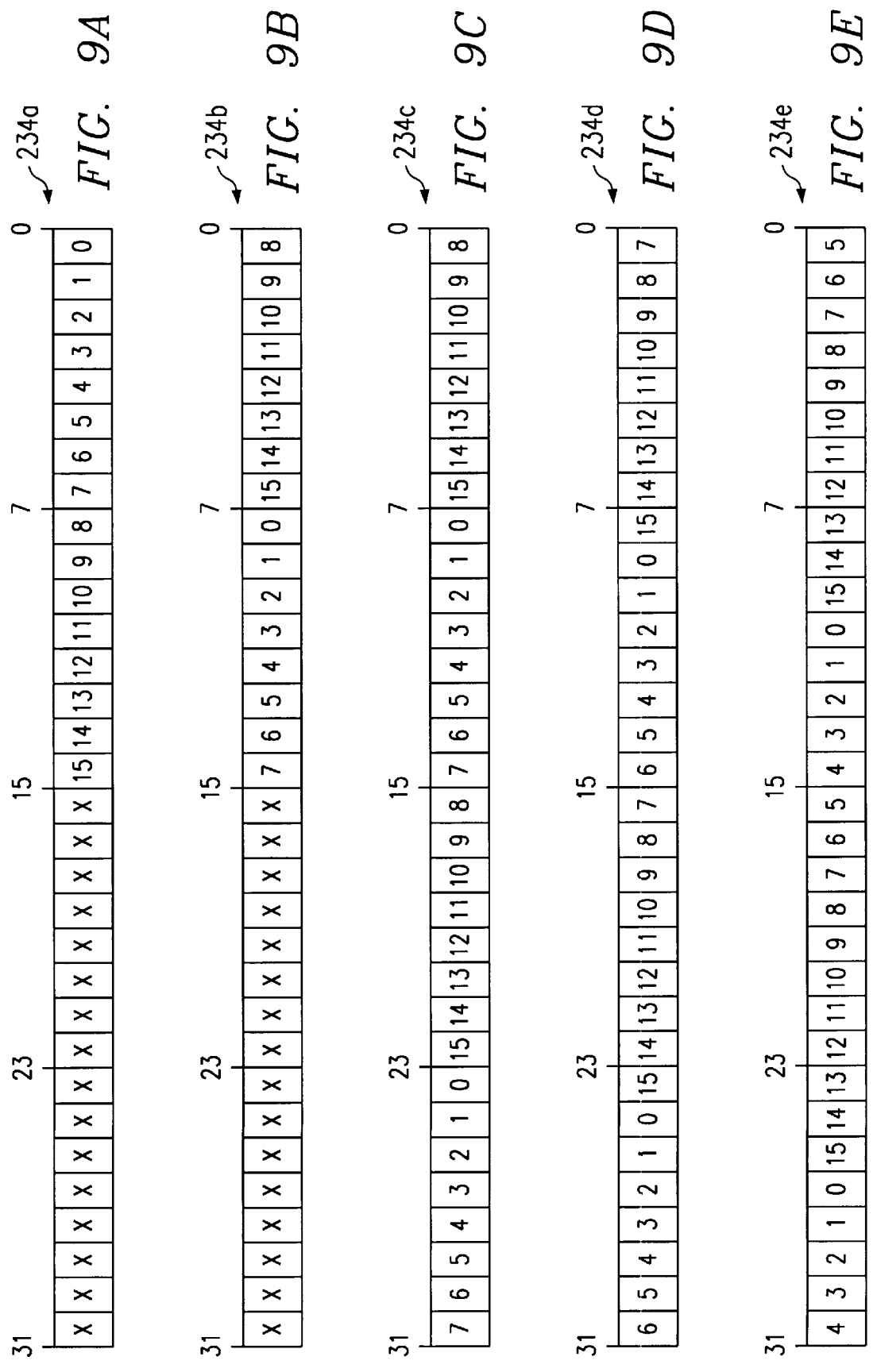

As one skilled in the art will readily appreciate, the combined shift and rotate circuit 150 must also be able to perform 8-bit to 15-bit shift/rotate operations on word sized operands. To provide this capability, a rotate operation, for example, an 11-bit rotate operation illustrated in FIGS. 9A–E, which includes a second pre-processing technique may be alternately performed on a 16-bit operand. Here, the operand 234a input the shift-by-eight circuit 152 and illustrated in FIG. 9A is identical to the operand 232a. Rather than passing through the shift-by-eight circuit 152 without pre-processing, however, the shift-by-eight circuit 152 performs a swap operation, i.e., the contents of bits 0–7 are placed in bits 8–15 and the contents of bits 8–15 are placed in bits 0–7. The operand 234b output the shift-by-eight circuit 152 and illustrated in FIG. 9B is then propagated to the shift-by-sixteen circuit 154 where the contents of bits 0–15 are smeared into bits 16–31 to produce the operand 234c illustrated in FIG. 9C.

The operand 234c is then propagated to the shift-by-one circuit 156. As the shift operation being performed is an 11-bit rotate left operation, the shift-by-one circuit 156 shifts the contents of bits 0–30 one bit to the left and places the contents of bit 31 into bit 0, thereby producing the operand 234d illustrated in FIG. 9D. The operand 234d is then propagated to the shift-by-two circuit 158. Again, as the shift operation being performed is an 11-bit rotate left operation, the shift-by-two circuit 158 shifts the contents of bits 0–29 two bits to the left and places the contents of bits 30–31 into bits 0–1, thereby producing the operand 234e illustrated in FIG. 9E. As no further shift or rotate operations are necessary, operand 234e passes through the shift-by-four circuit 160 and is placed on the bus 148b for transport to the register file 24 where bits 16–31 are discarded. As may be seen, by combining an 8-bit swap with a 3-bit rotate left operation, bits 0–15 of the result placed on the bus 148b is an 11-bit rotate left operation performed on an 16-bit operand. In this manner, an 11-bit rotate operation is performed on a word sized operand using only the same interconnect between bits 0 and 31 needed for performing rotate operations on byte sized operands without need for either an interconnection between bits 0 and 15 or for a separate conditioning unit to pre-process the word sized operand.

Finally it should be noted that 1-bit to 31-bit shift/rotate operations may be performed on 32-bit operands by propagating the 32-bit operand through the combined shift and rotate circuit 150 while enabling selected ones of the shift-by-eight, shift-by-sixteen, shift-by-one, shift-by-two and shift-by-four circuits 152–160. For shift operations using 32-bit operands, neither pre-processing nor discarding is necessary.

Thus, there has been described and illustrated herein, a circuit for performing shift operations in 32-bit architectures which eliminates the need for either an interconnection between bits 0 and 7 and an interconnection between bits 0 and 15 or for a preconditioning unit to pre-process byte and word sized operands to be used in shift operations performed in 32-bit architectures. Instead, a circuit capable of performing shift operations in 32-bit architectures which requires only a single interconnection between bits 0 and 31 while simultaneously eliminating the need for a preconditioning unit to pre-process byte and word sized operands has been provided. The aforementioned circuit greatly reduces datapath logic while minimally increasing control logic. Furthermore, by the simultaneous elimination of the need for a preconditioning unit, overhead resulting from such shift operations may be significantly reduced. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A method of performing up to (8N−1)-bit shift/rotate operations on an operand of any of a plurality of sizes between 1 and N bytes, comprising the steps of:

sequentially propagating said operand through a first group of at least one shift and rotate unit;

said first group of at least one shift and rotate unit selectively performing shift/rotate/pass operations on said operand if said operand is N bytes in size and replicating said operand into N bytes if said operand is less than N bytes in size; and sequentially propagating said operand through a second group of at least one shift and rotate unit;

said second group of at least one shift and rotate unit selectively performing shift/rotate/pass operations on said operand.

2. A method of performing up to (8N−1)-bit shift/rotate operations on an operand sized between 1 and N bytes according to claim 1 wherein said first group of at least one shift and rotate unit includes an 8-bit shift and rotate unit and further comprising the steps of:

propagating said operand through said 8-bit shift and rotate unit;

if said operand is 1 byte in size, replicating said 1 byte operand to produce a 2 byte operand; and if said operand is N bytes in size and said requested shift/rotate/pass operation is between an 8-bit shift/rotate and a (8N−1) bit shift/rotate, performing an 8-bit shift/rotate operation on said operand.

3. A method of performing up to (8N−1)-bit shift/rotate operations on an operand sized between 1 and N bytes according to claim 2 wherein said first group of at least one shift and rotate unit includes a 16-bit shift and rotate unit and further comprising the steps of:

propagating said operand through said 16-bit shift and rotate unit;

if said operand is 2 bytes in size, replicating said 2 byte operand to produce a 4 byte operand; and if said operand is N bytes in size and said requested shift/rotate/pass operation is between a 16-bit shift/rotate and a (8N−1) bit shift/rotate, performing a 16-bit shift/rotate operation on said operand.

4. A method of performing up to (8N−1)-bit shift/rotate operations on an operand sized between 1 and N bytes according to claim 1 wherein said first group of at least one shift and rotate unit includes an 8-bit shift and rotate unit and a 16-bit shift and rotate unit and further comprising the steps of:

propagating said operand through said 8-bit shift and rotate unit;

if said operand is 1 byte in size, replicating said 1 byte operand to produce a 2 byte operand;

if said operand is 2 bytes in size, passing said operand without performing an operation thereon; and if said operand is N bytes in size and said requested shift/rotate operation is between an 8-bit shift/rotate and a (8N−1) bit shift/rotate, performing an 8-bit shift/rotate operation on said operand; and propagating said operand through said 16-bit shift and rotate unit;

if said operand is 2 bytes in size, replicating said 2 byte operand to produce a 4 byte operand; and if said operand is N bytes in size and said requested shift/rotate operation is between a 16-bit shift/rotate and a (8N−1) bit shift/rotate, performing a 16-bit shift/rotate operation on said operand.

5. A method of performing up to (8N−1)-bit shift/rotate operations on an operand sized between 1 and N bytes according to claim 1 wherein said first group of at least one shift and rotate unit includes an 8-bit shift and rotate unit and a 16-bit shift and rotate unit and further comprising the steps of:

propagating said operand through said 8-bit shift and rotate unit;

if said operand is 1 byte in size, replicating said 1 byte operand to produce a 2 byte operand;

if said operand is 2 bytes in size, swapping bytes of said operand; and if said operand is N bytes in size and said requested shift/rotate operation is between an 8-bit shift/rotate and a (8N−1) bit shift/rotate, performing an 8-bit shift/rotate operation on said operand; and propagating said operand through said 16-bit shift and rotate unit;

if said operand is 2 bytes in size, replicating said 2 byte operand to produce a 4 byte operand; and if said operand is N bytes in size and said requested shift/rotate operation is between a 16-bit shift/rotate and a (8N−1) bit shift/rotate, performing a 16-bit shift/rotate operation on said operand.

6. An arithmetic operation unit for performing shift/rotate operations on operands of any of a plurality of sizes between 1 and N bytes, comprising:

a first shift and rotate circuit having an input for receiving an operand sized between 1 and N bytes and an output, said first shift and rotate circuit selectively performing shift/rotate/pass operations on N byte sized operands and pre-processing operations on less than N byte sized operands; and a second shift and rotate circuit having an input coupled to said output of said first shift and rotate circuit and an output, said second shift and rotate circuit selectively performing shift/rotate/pass operations on N byte sized operands.

7. An arithmetic operation unit according to claim 6 and further comprising:

a third shift and rotate circuit coupled between said output of said first shift and rotate circuit and said input of said second shift and rotate circuit, said third shift and rotate circuit selectively performing shift/rotate/pass operations on N byte sized operands and pre-processing operations on less than N byte sized operands.

8. An arithmetic operation unit according to claim 7 and further comprising a fourth shift and rotate circuit having an input coupled to said output of said second shift and rotate circuit and an output, said fourth shift and rotate circuit selectively performing shift/rotate/pass operations on N byte sized operands.

9. An arithmetic operation unit according to claim 8 and further comprising a fifth shift and rotate circuit having an input coupled to said output of said fourth shift and rotate circuit and an output, said fifth shift and rotate circuit selectively performing shift/rotate/pass operations on N byte sized operands.

10. An arithmetic operation unit according to claim 9 wherein said first, second, third, fourth and fifth shift and rotate circuits further comprise 8-bit, 1-bit, 16-bit, 2-bit and 4-bit shift and rotate circuits, respectively.

11. An arithmetic operation unit for performing shift/rotate operations on operands of any of a plurality of sizes between 1 and 4 bytes, comprising:
   an 8-bit shift and rotate circuit having an input for receiving an operand sized between 1 and 4 bytes and an output, said 8-bit shift and rotate circuit selectively performing shift/rotate/pass operations on 4 byte sized operands and pre-processing operations which replicate 1 byte sized operands into 2 byte sized operands;
   a 16-bit shift and rotate circuit having an input coupled to said output of said 8-bit shift and rotate circuit and an output, said 16-bit shift and rotate circuit selectively performing shift/rotate/pass operations on 4 byte sized operands and pre-processing operations which expand 2 byte sized operands into 4 byte sized operands;
   a 1-bit shift and rotate circuit having an input coupled to said output of said 16-bit shift and rotate circuit and an output, said 1-bit shift and rotate circuit selectively performing shift/rotate/pass operations on 4 byte sized operands;
   a 2-bit shift and rotate circuit having an input coupled to said output of said 1-bit shift and rotate circuit and an output, said 2-bit shift and rotate circuit selectively performing shift/rotate/pass operations on 4 byte sized operands; and
   a 4-bit shift and rotate circuit having an input coupled to said output of said 2-bit shift and rotate circuit and an output, said 4-bit shift and rotate circuit selectively performing shift/rotate/pass operations on said 4 byte sized operands.

12. An arithmetic operation unit for performing shift and rotate operations on operands of any of a plurality of sizes between 1 and N bytes, comprising:
   first means for selectively performing shift/rotate/pass operations on N byte sized operands and pre-processing operations on less than N byte sized operands to replicate less than N byte sized operands into N bytes; and
   second means for selectively performing shift/rotate/pass operations on N byte sized operands output by said first means.

13. An arithmetic operation unit according to claim 12 wherein said first means for selectively performing shift/rotate/pass operations on N byte sized operands and pre-processing operations on less than N byte sized operands further comprises means for selectively performing 8-bit shift/rotate/pass operations on 32-bit operands and pre-processing 8-bit operands into 16-bit operands.

14. An arithmetic operation unit according to claim 13 wherein said second means for selectively performing shift/rotate/pass operations on N byte sized operands and pre-processing operations on less than N byte sized operands further comprises means for selectively performing 16-bit shift/rotate/pass operations on 32-bit operands and pre-processing 16-bit operands into 32-bit operands.

15. An arithmetic operation unit according to claim 14 wherein said second means for selectively performing shift/rotate/pass operations on N byte sized operands further comprises means for selectively performing 1-bit shift/rotate/pass operations on 32-bit operands.

16. An arithmetic operation unit according to claim 15 wherein said second means for selectively performing shift/rotate/pass operations on N byte sized operands further comprises means for selectively performing 2-bit shift/rotate/pass operations on 32-bit operands.

17. An arithmetic operation unit according to claim 16 wherein said second means for selectively performing shift/rotate/pass operations on N byte sized operands further comprises means for selectively performing 4-bit shift/rotate/pass operations on 32-bit operands.

18. A microprocessor, comprising:
   a register for holding an operand of any of a plurality of sizes between 1 and N bytes; and
   an execution unit for performing arithmetic operations on said operand;
   said execution unit including:
      a first n-bit internal bus;
      a second n-bit internal bus; and
      a multiple stage, shift and rotate circuit having an input coupled to said first n-bit internal bus and an output coupled to said second n-bit internal bus;
      said multiple stage shift and rotate circuit configured to perform (1 to (n−1))-bit shift/rotate/pass operations on (8 to n)-bit operands propagated thereto via said first n-bit internal bus;
      wherein at least one stage of said multiple stage shift and rotate circuit selectively performs shift/rotate/pass operations on n-bit operands and replicates operands sized less than n-bit operands to produce n-bit sized operands.

19. A microprocessor according to claim 18 wherein said multiple stage, shift and rotate circuit further comprises:
   an 8-bit shift and rotate circuit having an input coupled to said first n-bit internal bus and an output coupled to said second n-bit internal bus, said 8-bit shift and rotate circuit selectively performing shift/rotate/pass operations on n-bit operands and pre-processing operations which replicate 8-bit operands into 16-bit operands.

20. A microprocessor according to claim 18 wherein said multiple stage, shift and rotate circuit further comprises:
   a 16-bit shift and rotate circuit having an input coupled to said first n-bit internal bus and an output coupled to said second n-bit internal bus, said 16-bit shift and rotate circuit selectively performing shift/rotate/pass operations on n-bit operands and pre-processing operations on 16-bit operands which replicate 16-bit operands into 32-bit operands.

21. A microprocessor according to claim 18 wherein said multiple stage, shift and rotate circuit further comprises:
   an 8-bit shift and rotate circuit having an input coupled to said first n-bit internal bus and an output, said 8-bit shift and rotate circuit selectively performing shift/rotate/pass operations on n-bit operands and pre-processing operations on 8-bit operands which replicate 8-bit operands into 16-bit operands;
   a 16-bit shift and rotate circuit having an input coupled to said output of said 8-bit shift and rotate circuit and an output coupled to said second n-bit internal bus, said 16-bit shift and rotate circuit selectively performing shift/rotate/pass operations on n-bit operands and pre-processing operations on 16-bit operands which replicate 16-bit operands into 32-bit operands.

22. A computer, comprising:

a system bus;

a memory subsystem; and a microprocessor;

said memory subsystem and said microprocessor coupled to said system bus for bi-directional exchanges of address, data and control signals therebetween;

said microprocessor including:

a multiple stage, shift and rotate circuit configured to perform (1 to 31)-bit shift/rotate/pass operations on (8 to 32)-bit operands propagated thereto;

wherein:

a first stage of said multiple stage shift and rotate circuit is an 8-bit shift and rotate unit which selectively performs 8-bit shift/rotate/pass operations on 32-bit operands and replicate 8-bit operands into 16-bit operands; and a second stage of said multiple stage shift and rotate circuit is a 16-bit shift and rotate circuit which selectively performs 16-bit shift/rotate/pass operations on 32-bit operands and replicate 16-bit operands into 32-bit operands.

23. A computer according to claim 22 wherein:

a third stage of said multiple stage, shift and rotate circuit is a 1-bit shift and rotate circuit which selectively performs 1-bit shift/rotate/pass operations on 32-bit operands.

24. A computer according to claim 23 wherein:

a fourth stage of said multiple stage, shift and rotate circuit is a 2-bit shift and rotate circuit which selectively performs 2-bit shift/rotate/pass operations on 32-bit operands.

25. A computer according to claim 24 wherein:

a fifth stage of said multiple stage, shift and rotate circuit is a 4-bit shift and rotate circuit which selectively performs 4-bit shift/rotate/pass operations on 32-bit operands.

* * * * *